United States Patent
Okuyama et al.

(10) Patent No.: US 7,213,924 B2
(45) Date of Patent: May 8, 2007

(54) IMAGE PROJECTION APPARATUS AND IMAGE PROJECTION SYSTEM

(75) Inventors: Atsushi Okuyama, Saitama (JP); Masayuki Abe, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 273 days.

(21) Appl. No.: 10/945,765

(22) Filed: Sep. 21, 2004

(65) Prior Publication Data
US 2005/0062936 A1    Mar. 24, 2005

(30) Foreign Application Priority Data
Sep. 24, 2003    (JP)    ............................. 2003-331937

(51) Int. Cl.
G03B 21/14    (2006.01)
G02F 1/01    (2006.01)
G02B 5/30    (2006.01)

(52) U.S. Cl. ........................... 353/33; 353/20; 348/752; 349/9

(58) Field of Classification Search .................. 353/20, 353/33, 30, 84; 348/762, 767, 780, 752; 349/9, 57, 62
See application file for complete search history.

(56) References Cited

U.S. PATENT DOCUMENTS 5,321,448 A * 6/1994 Ogawa ........................ 353/34

2001/0040652 A1* 11/2001 Hayashi ........................ 349/96
2002/0140905 A1* 10/2002 Ouchi et al. ................... 353/31
2003/0081313 A1* 5/2003 Hiraishi et al. ............. 359/483

FOREIGN PATENT DOCUMENTS

JP    2001-154268    6/2001

* cited by examiner

Primary Examiner—W. B. Perkey
Assistant Examiner—Andrew Sever
(74) Attorney, Agent, or Firm—Morgan & Finnegan LLP

(57) ABSTRACT

The image projection apparatus includes a first, a second and a third reflective liquid crystal display element, an illumination optical system which color-separates light from a light source into first, second and third color light component and illuminating the three reflective liquid crystal display elements with the respective color light components, a projection optical system combining the color light components emerged from the three reflective liquid crystal display elements and projecting the combined color light components onto a projection surface, and an incidence side polarizing plate arranged between the light source and at least one of the three reflective liquid crystal display elements. An average value of a transmittance, in a wavelength region of 450 nm to 630 nm, of the incidence side polarizing plate for light of a polarization direction to be blocked thereby is 5% or less.

21 Claims, 8 Drawing Sheets

IMAGE PROJECTION APPARATUS AND IMAGE PROJECTION SYSTEM

BACKGROUND OF THE INVENTION

1. Field of the Invention

The present invention relates to a projector which enlarges an original image formed using a liquid crystal panel or the like and projects the enlarged image onto a projection surface, such as a screen, and in particular to a projector forming the original image with a plurality of reflective liquid crystal panels.

2. Description of the Related Art

An image projection apparatus combining reflective liquid crystal display elements and polarization beam splitters is disclosed in Japanese Patent Application Laid-Open No. 2001-154268. In Japanese Patent Application Laid-Open No. 2001-154268, an image projection apparatus made of a white light source 1001, reflective liquid crystal display elements 1002R (reflective liquid crystal display element forming a red original image), 1002G (reflective liquid crystal display element forming a green original image), and 1002B (reflective liquid crystal display element forming a blue original image) forming red (R), green (G) and blue (B) original images, and a projection optical system 1003, as shown in FIG. 12, includes a dichroic mirror 1004, a color separation system and a color combination system. The dichroic mirror 1004 is arranged between the white light source 1001 and the reflective liquid crystal display elements 1002R, 1002G and 1002B. The color separation system includes first and second polarization beam splitters 1005 and 1006 arranged between the dichroic mirror 1004 and the reflective liquid crystal display elements 1002R, 1002G and 1002B. The color combination system includes the first and second polarization beam splitters 1005 and 1006 as well as a third polarization beam splitter 1007, which are arranged between the reflective liquid crystal display elements and the projection optical system.

Here, color separation with the polarization beam splitters is performed through the association of color components (R, B) with polarization directions (P, S) by providing between the dichroic mirror 1004 and the second polarization beam splitter 1006 a first color selective wave plate 1008 which can rotate the polarization direction of light of a predetermined wavelength region (here, light in the wavelength region of blue) by 90° and by providing between the second polarization beam splitter 1006 and the third polarization beam splitter 1007 a second color selective wave plate 1009 (here, one which rotates the polarization direction of light in the wavelength region of blue by 90°). Thus, the polarization direction of blue light is rotated 90° by the first color selective wave plate 1008, the blue light is turned into P-polarized light, the red light is turned into S-polarized light, the red and blue light are incident on the second polarization beam splitter 1006, and are separated into an optical path (R) of second color light and an optical path of third color light.

Moreover, in a first optical path, the light reflected by the first polarization beam splitter 1005 has its polarization direction rotated 90° and is reflected by the first reflective liquid crystal display element 1002G, is transmitted by the first polarization beam splitter 1005, has its polarization direction rotated 90° by a ½ wave plate 1012, is reflected by the third polarization beam splitter 1007, and reaches the projection optical system 1003. The light of the second optical path has its polarization direction rotated 90° and is reflected by the second reflective liquid crystal display element 1002R, and is transmitted by the second polarization beam splitter 1006. The light of the third optical path has its polarization direction rotated 90° and is reflected by the third reflective liquid crystal display element 1002B, and is reflected by the second polarization beam splitter 1006. At the second polarization beam splitter 1006, the optical paths of the two colors red and blue (R, B) are combined into one, the polarization direction of the blue light is rotated 90° by the second color selective wave plate 1009, both the red and the blue light become P-polarized light, are transmitted by the third polarization beam splitter 1007, and reach the polarization optical system 1003, thus combining the light of the three colors.

In this conventional example, polarizing plates 1010 and 1011 are respectively arranged on the incidence side of the first polarization beam splitter 1005 and the incidence side of the first color selective wave plate 1008, and unnecessary polarized components included in the illumination light from the light source 1000 are cut, thus increasing the contrast.

Regarding the performance of the polarizing plates, Japanese Patent Application Laid-Open No. 2001-154268 mentions, that a maximal transmittance of 1% for light of unnecessary polarization directions is necessary. In order to attain such high characteristics, dye-based polarizing plates with high heat resistance must be used for the polarizing plates used in image projection apparatuses using a liquid crystal. However, even though dye-based polarizing plates have a sufficient polarization action of absorbing unnecessary polarized components in the wavelength region of white light, they have the problem that their transmittance of transmitted polarized components is low, and their brightness is lowered significantly when the contrast is increased. As a countermeasure, the wavelength range over which the conventional example has the polarization action of absorbing unnecessary polarized components is limited to a predetermined range, thus trying to prevent a decrease of the transmittance.

However, what causes a decrease in contrast in the color separation and combination systems of the image projection apparatus of this conventional example is not only the degree of polarization of the light from the light source discussed in this conventional example, but also the angular characteristics of the polarization beam splitting film of the polarization beam splitters. Even in polarization beam splitting films which are designed such that they have a polarization separation capability of substantially 100% with respect to a predetermined incidence angle (45°), for incidence angles which deviate from the predetermined angle, the polarization separation performance deteriorates. In particular in order to attain a bright image, the range of incidence angles of the illumination light flux on the polarization beam splitting film must be increased, so that the influence of the angular characteristics is considerable.

Thus, in order to realize high contrast in image projection apparatuses using reflective liquid crystal display elements, it is necessary to eliminate unnecessary polarization components over the entire wavelength region, and there was the problem that a high contrast cannot be realized when polarizing plates as in the conventional example are used in which the characteristics of wavelength plates which are used for the optical paths of red (R) and blue (B) are limited for the blue wavelength region, and any polarization direction is transmitted in the red region.

SUMMARY OF THE INVENTION

An image projection apparatus according to one aspect of the present invention comprises a first reflective liquid crystal display element, a second reflective liquid crystal display element, and a third reflective liquid crystal display element; and an illumination optical system comprising a color separation optical system which color-separates light from a light source into a first color light component, a second color light component and a third color light component respectively corresponding to at least one of the three reflective liquid crystal display elements, the illumination optical system illuminating the three reflective liquid crystal display elements respectively with the three color light components. The image projection apparatus also comprises a color combination optical system combining the color light components emerged from the three reflective liquid crystal display elements; a projection optical system projecting light which has been color-combined by the color combination optical system onto a projection surface; and an incidence side polarizing plate arranged in an optical path from the light source to the three reflective liquid crystal display elements. An average value of a transmittance, in a wavelength region of 450 nm to 630 nm, of the incidence side polarizing plate for light of a polarization direction to be blocked thereby is 5% or less.

An image projection apparatus according to another aspect of the present invention comprises a first reflective liquid crystal display element, a second reflective liquid crystal display element, and a third reflective liquid crystal display element; and an illumination optical system comprising a color separation optical system which color-separates light from a light source into three color light components corresponding to the three reflective liquid crystal display elements, the illumination optical system illuminating the three reflective liquid crystal display elements respectively with the three color light components. The image projection apparatus also comprises a projection optical system comprising a color combination optical system which combines the color light components emerged from the three reflective liquid crystal display elements, the projection optical system projecting light which has been color-combined by the color combination optical system onto a projection surface; and at least one of an emerging side polarizing plate arranged in an optical path from the three reflective liquid crystal display elements to the projection optical system. An average value of a transmittance, in a wavelength region of 450 nm to 630 nm, of the emerging side polarizing plate for light of a polarization direction to be blocked thereby is 5% or less.

Furthermore, an image projection system according to another aspect of the present invention includes one of the above-described image projection apparatuses and an image information supply apparatus supplying image information to the image projection apparatus.

These and further objects and features of the image projection apparatus and the image projection system according to the present invention will become apparent from the following detailed description of preferred embodiments thereof taken in conjunction with the accompanying drawings.

DESCRIPTION OF THE PREFERRED EMBODIMENTS

Figure 1:
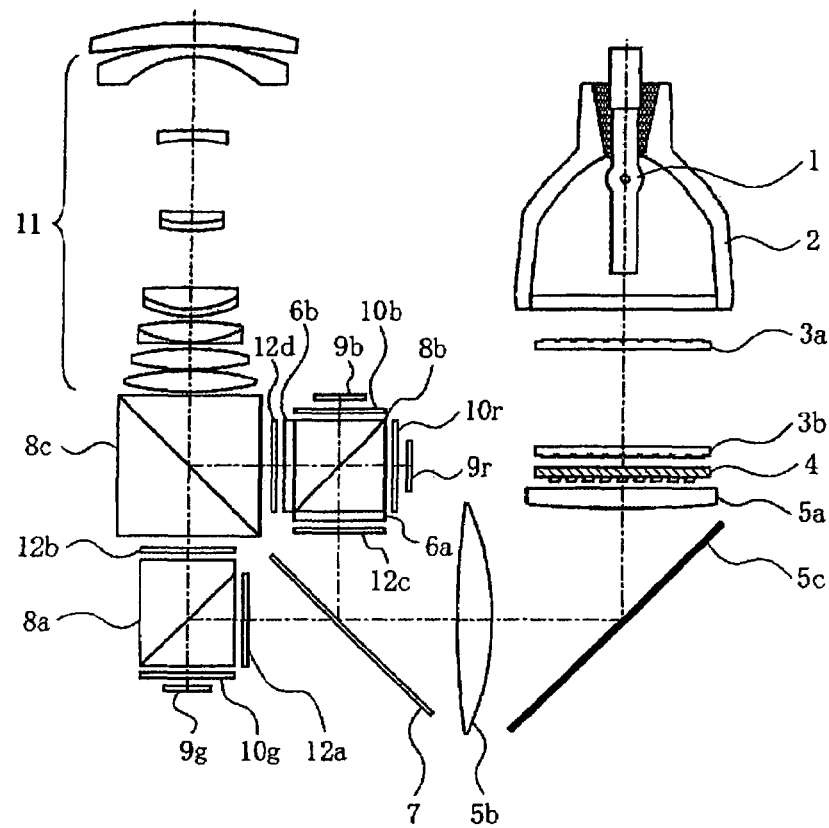
FIG. 1 is a diagram showing a first embodiment of the present invention.

An image projection apparatus according to an embodiment of the present invention comprises a first reflective liquid crystal display element, a second reflective liquid crystal display element, and a third reflective liquid crystal display element; an illumination optical system comprising a color separation optical system which color-separates light from a light source into a first color light component, a second color light component and a third color light component respectively corresponding to the three reflective liquid crystal display elements, the illumination optical system illuminating the three reflective liquid crystal display elements respectively with the three color light components; a color combination optical system combining the color light components emerged from the three reflective liquid crystal display elements; and a projection optical system projecting light which has been color-combined by the color combination optical system onto a projection surface. Furthermore, an incidence side polarizing plate is arranged in the image projection apparatus in an optical path from the light source to the three reflective liquid crystal display elements. An average value of a transmittance, in a wavelength region of 450 nm to 630 nm, of the incidence side polarizing plate for light of a polarization direction to be blocked thereby is 5% or less.

For example, if the polarizing plate is designed so as to transmit S-polarized light, then P-polarized light is ideally completely blocked. This means that here, the light with the polarization direction to be blocked is the P-polarized light, and the transmittance at which this P-polarized light is transmitted by the polarizing plate in the wavelength region of 450 nm to 630 nm is on average 5% or less. Needless to say, it is also possible to swap the P-polarized light and the S-polarized light, and here the P-polarized light and the S-polarized light do not need to be ideal P-polarized light or ideal S-polarized light with respect to optical elements arranged before or after (for example the polarization beam splitters or the dichroic mirror or the like), and the polarization direction may also deviate, for example, 3° (ideally up to 1°) from ideal P-polarized light or ideal S-polarized light.

It is preferable that an average value of a transmittance, in a wavelength region of 450 nm to 630 nm, of the incidence side polarizing plate for light of a polarization direction to be transmitted thereby is 90% or more.

It is also preferable that the incidence side polarizing plate comprises a first incidence side polarizing plate arranged in an optical path of the first color light component and a second incidence side polarizing plate arranged in an optical path which is shared by the second color light component and the third color light component.

It is also preferable that substantially only the first color light component is incident on the first incidence side polarizing plate, and substantially only the second color light component and the third color light component are incident on the second incidence side polarizing plate. Here, "substantially" means that at least nine tenths of the light incident on the first incidence side polarizing plate is light of a wavelength region of the first color light component, and at least nine tenths of the light incident on the second incidence side polarizing plate is light of the second color light component and the third color component.

It is also preferable that the first color light component is light of a green color region, the second color light component is light of a red color region, and the third color light component is light of a blue color region.

It is also preferable that the color separation optical system includes a polarization separation surface.

Here, it is further preferable that the color separation optical system comprises a first color separation element separating the first color light component from white light emitted by the light source; a second color separation element guiding the first color light component emerged from the first color separation element to the first reflective liquid crystal display element; and a third color separation element separating the second color light component and the third color light component emerged from the first color separation element and guiding the second color light component and the third color light component respectively to the second reflective liquid crystal display element and the third reflective liquid crystal display element.

It is preferable that the first color separation element is a dichroic mirror or a dichroic prism; and the second color separation element and the third color separation element are polarization beam splitting elements.

It is preferable that the first color separation element, the second color separation element and the third color separation element are all polarization beam splitting elements.

It is preferable that the first incidence side polarizing plate is arranged between the first color separation element and the second color separation element, and that the second incidence side polarizing plate is arranged between the first color separation element and the third color separation element.

It is preferable that a color selective wave plate rotating a polarization direction of one of the second color light component and the third color light component by substantially 90° is arranged between the second incidence side polarizing plate and the third color separation element.

It is preferable that an emerging side polarizing plate is arranged in an optical path from the three reflective liquid crystal display elements to the projection optical system; and an average value of a transmittance, in a wavelength region of 450 nm to 630 nm, of the emerging side polarizing plate for light of a polarization direction to be blocked thereby is 5% or less.

It is preferable that an average value of a transmittance, in a wavelength region of 450 nm to 630 nm, of the emerging side polarizing plate for light of a polarization direction to be transmitted thereby is 90% or more.

It is preferable that the color combination optical system comprises a first color combination element guiding the first color light component emerged from the first reflective liquid crystal display element to an optical system of a later stage; a second color combination element color-combining the second color light component emerged from the second reflective liquid crystal display element and the third color light component emerged from the third reflective liquid crystal display element; and a third color combination element color-combining the light emerged from the first color combination element and the light emerged from the second color combination element.

It is also preferable that the color combination optical system comprises a first emerging side polarizing plate arranged between the first color combination element and the third color combination element; and a second emerging side polarizing plate arranged between the second color combination element and the third color combination element.

It is also preferable that the color combination optical system comprises a color selective wave plate arranged between the second emerging side polarizing plate and the third color combination element, the color selective wave plate rotating a polarization direction of one of the second color light component and the third color light component by substantially 90°.

It is preferable that the color separation optical system and the color combination optical system share two polarization beam splitting elements.

An image projection apparatus according to another embodiment of the present invention comprises a first reflective liquid crystal display element, a second reflective liquid crystal display element, and a third reflective liquid crystal display element; an illumination optical system comprising a color separation optical system color-separating light from a light source into three color light components corresponding to the three reflective liquid crystal display elements, the illumination optical system illuminating the three reflective liquid crystal display elements respectively with the three color light components; and a projection optical system comprising a color combination optical system which combines color light components emerged from the three reflective liquid crystal display elements, the projection optical system projecting light which has been color-combined by the color combination optical system onto a projection surface. In this image projection apparatus, an emerging side polarizing plate is arranged in an optical path from the three reflective liquid crystal display elements to the projection optical system, and an average value of a transmittance, in a wavelength region of 450 nm to 630 nm, of the emerging side polarizing plate for light of a polarization direction to be blocked thereby is 5% or less.

It is preferable that an average value of a transmittance, in a wavelength region of 450 nm to 630 nm, of the emerging side polarizing plate for light of a polarization direction to be transmitted thereby is 90% or more.

It is preferable that the first color light component emerges from the first reflective liquid crystal display element, passes through the first color combination element and the first emerging side polarizing plate and then through the third color combination element, and is incident on the projection optical system. It is preferable that the first color combination element and the third color combination element are both polarization beam splitting elements.

It is preferable that the second and third color light components emerge from the second and third reflective liquid crystal display elements, pass though a second color combination optical element, a color selective wave plate which rotates a polarization direction of either the second color light component or the third color light component by substantially 90°, a second emerging side polarizing plate, and a third color combination element, and is then incident on the projection optical system.

It is preferable that the second color combination element and the third color combination element are both polarization beam splitting elements.

It is preferable that the third color combination element color-combines the first color light component, the second color light component and the third color light component.

In this image projection apparatus, it is preferable that the color combination optical system comprises a first color combination element guiding the first color light component emerged from the first reflective liquid crystal display element to an optical system of a later stage; a second color combination element color-combining the second color light component emerged from the second reflective liquid crystal display element and the third color light component emerged from the third reflective liquid crystal display element; and a third color combination element color-combining the light emerged from the first color combination element and the light emerged from the second color combination element. It is also preferable that the color combination optical system comprises a first emerging side polarizing plate arranged between the first color combination element and the third color combination element; a second emerging side polarizing plate arranged between the second color combination element and the third color combination element, and a color selective wave plate arranged between the second emerging side polarizing plate and the third color combination element, the color selective wave plate rotating a polarization direction of either the second color light component or the third color light component by substantially 90°.

An image projection apparatus according to yet another embodiment of the present invention comprises a first reflective liquid crystal display element, a second reflective liquid crystal display element, and a third reflective liquid crystal display element; a color separation optical system color-separating light from a light source into a first color light component, a second color light component and a third color light component respectively corresponding to the three reflective liquid crystal display elements; and a projection optical system comprising a color combination optical system which combines color light components emerged from the three reflective liquid crystal display elements, the projection optical system projecting light which has been color-combined by the color combination optical system onto a projection surface. Here, the color separation optical system comprises a first color separation element separating light from the light source into the first color light component and the second and third color light components; a second color separation element guiding the first color light component to the first reflective liquid crystal display element; and a third color separation element color-separating the second color light component and the third color light component and guiding the second color light component and the third color light component respectively to the second reflective liquid crystal display element and the third reflective liquid crystal display element; a first incidence side polarizing plate arranged between the first color separation element and the second color separation element; a second incidence side polarizing plate arranged between the first color separation element and the third color separation element; and a first color selective wave plate a color selective wave plate arranged between the second incidence side polarizing plate and the third color separation element and rotating a polarization direction of the second color light component by substantially 90°. The color combination optical system comprises a first color combination element, a second color combination element, and a third color combination element; a first emerging side polarizing plate arranged between the first color combination element and the second color combination element; a second emerging side polarizing plate arranged between the second color combination element and the third color combination element; and a second color selective wave plate arranged between the second emerging side polarizing plate and the third color combination element, the second color selective wave plate rotating a polarization direction of the third color light component by substantially 90°.

In this image projection apparatus the first color combination element guides the first color light component emerged from the first reflective liquid crystal display element to the third color combination element, and the second color combination element color-combines the second color light component emerged from the second reflective liquid crystal display element and the third color light component emerged from the third reflective liquid crystal display element and guides the second color light component and the third color light component to the third color combination element. Moreover, the third color combination element color-combines the first color light component, the second color light component and the third color light component, and guides the color-combined three color light components to the projection optical system.

Here, an average value of a transmittance, in a wavelength region of 450 nm to 630 nm, of the first and second incidence side polarizing plates for light of a polarization direction to be blocked thereby is 5% or less.

Also, an average value of a transmittance, in a wavelength region of 450 nm to 630 nm, of the first and second incidence side polarizing plate for light of a polarization direction to be transmitted thereby is 90% or more.

Moreover, an average value of a transmittance, in a wavelength region of 450 nm to 630 nm, of the first and second emerging side polarizing plates for light of a polarization direction to be blocked thereby is 5% or less.

And an average value of a transmittance, in a wavelength region of 450 nm to 630 nm, of the first and second emerging side polarizing plate for light of a polarization direction to be transmitted thereby is 90% or more.

In yet another image projection apparatus, light from a light source is color-separated into a first color light component, a second color light component and a third color light component and illuminates a first reflective liquid crystal display element, a second reflective liquid crystal display element and a third reflective liquid crystal display element, and the color light components emerged from the three reflective liquid crystal display elements are combined and projected onto a projection surface. This image projection apparatus comprises a color separation element color-separating light from the light source into the first color light component, and the second and third color light components; a first incidence side polarizing plate analyzing the first color light component emerged from the first color separation element; a first polarization beam splitting element reflecting or transmitting light emerged from the first incidence side polarizing plate and guiding that light to the first reflective liquid crystal display element, and transmitting or reflecting a first image light component emerged from the first reflective liquid crystal display element and emitting the first image light component; a first emerging side polarizing plate analyzing light emerged from the first polarization beam splitting element; and a second incidence side polarizing plate analyzing the second and third color light components emerged from the color separation element. Moreover, the image projection apparatus comprises a first color selective wave plate rotating a polarization direction of the second color light component among the light emerged from the second incidence side polarizing plate by substantially 90°; a second polarization beam splitting element color-separating light emerged from the first color selective wave plate into the second color light component and the third color light component, guiding the second color light component and the third color light component respectively to the second reflective liquid crystal display element and the third reflective liquid crystal display element, and color-combining a second image light component emerged from the second reflective liquid crystal display element and a third image light component emerged from the third reflective liquid crystal display element; a second color selective wave plate rotating a polarization direction of the third color light component among the light emerged from the second incidence side polarizing plate by substantially 90°; a second emerging side polarizing plate analyzing light emerged from the second polarization beam splitting element; and a third polarization beam splitting element color-combining the first image light component emerged from the first emerging side polarizing plate and the second and third image light components emerged from the second emerging side polarizing plate.

An average value of a transmittance, in a wavelength region of 450 nm to 630 nm, of the first and second incidence side polarizing plates for light of a polarization direction to be blocked thereby is 5% or less;

Moreover, an average value of a transmittance, in a wavelength region of 450 nm to 630 nm, of the first and second incidence side polarizing plate for light of a polarization direction to be transmitted thereby is 90% or more;

Also, an average value of a transmittance, in a wavelength region of 450 nm to 630 nm, of the first and second emerging side polarizing plates for light of a polarization direction to be blocked thereby is 5% or less;

And an average value of a transmittance, in a wavelength region of 450 nm to 630 nm, of the first and second emerging side polarizing plate for light of a polarization direction to be transmitted thereby is 90% or more.

It is even more preferable that the image projection apparatus as described above further includes a polarization conversion element converting the light from the light source into light of a predetermined polarization direction arranged between the light source and the first color separation element, which separates the light from the light source into a first color light component and second and third color light components. Moreover, it is preferable that the first color separation element is a dichroic mirror, but instead of the first color separation element, it is also possible to arrange a color selective wave plate rotating either the polarization direction of the first color light component or the polarization direction of the second and third color light components by substantially 90°, and a polarization beam splitting element (polarization beam splitter), and to separate the light emerging from this color selective wave plate with the polarization beam splitting element into the first color light component and the second and third color light components.

Here, the optical systems constituting the color separation and combination systems can be made smaller by using the same polarization beam splitter for the second and third polarization beam splitter.

Furthermore, the parts costs can be reduced and an inexpensive optical system can be realized by using the same polarizing plate for the polarizing plates on the projection system side and the polarizing plates on the illumination system side, which are provided for the respective color light components.

Furthermore, an image projection system according to the present embodiment includes the above-described image projection apparatus, and an image information supply apparatus supplying image information to the image projection apparatus.

In the following, embodiments of the present invention are described with reference to the accompanying drawings.

Embodiment 1

FIG. 1 is a diagram showing a first embodiment of the present invention. In FIG. 1, reference numeral 1 denotes a light source emitting white light with a continuous spectrum. Reference numeral 2 denotes a reflector condensing the light in a predetermined direction. Reference numeral 3a denotes a first fly-eye lens having rectangular lenses in a matrix arrangement. Reference numeral 3b denotes a second fly-eye lens made of a lens array corresponding to the individual lenses in the first fly-eye lens. Reference numeral 4 denotes a polarization conversion element which aligns unpolarized light into polarized light of a predetermined polarization direction. Reference numerals 5a and 5b denote condenser lenses, and reference numeral 5c denotes a reflective mirror. Reference numeral 6a denotes a first color selective wave plate, which rotates the polarization direction of blue light by 90° but does not rotate the polarization direction of red light, and reference numeral 6b denotes a second color selective wave plate, which rotates the polarization direction of red light by 90° but does not rotate the polarization direction of blue light. Reference numeral 7 denotes a dichroic mirror, which reflects light of the wavelength region of blue (B) and red (R), and transmits light of the wavelength region of green (G). Reference numerals 8a, 8b and 8c denote, respectively, a first polarization beam splitter, a second polarization beam splitter and a third polarization beam splitter, which transmit P-polarized light and reflect S-polarized light. Reference numerals 9r, 9g and 9b denote, respectively, a reflective liquid crystal display element for red, a reflective liquid crystal display element for green, and a reflective liquid crystal display element for blue, which reflect light and display an image by image modulation. Reference numerals 10r, 10g and 10b denote, respectively, a ¼ wave plate for red, a ¼ wave plate for green, and a ¼ wave plate for blue. Reference numeral 11 denotes a projection lens, and reference numerals 12a, 12b, 12c and 12d denote polarizing plates, respectively.

Here, the projection lens (projection optical system) 11 is of course not limited to a lens and may also be constituted by a mirror alone or by a combination of mirrors and lenses.

The following is an explanation of the optical operation. The light emitted from the light source 1 is directed by the reflector 2 into a predetermined direction. Here, the reflector 2 has a parabolic surface, and the light from the focus position of the parabolic surface is turned into a light flux which is parallel to the symmetry axis of the parabolic surface. The reflector 2 is not limited to parabolic surfaces, and may also have an ellipsoidal surface. In this case, a parallel light flux is formed by a combination of the ellipsoidal reflector with a convex lens or a concave lens. It should be noted, however, that the light source 1 is not an ideal point light source, but the light emission point has a finite size, so that the condensed light flux also includes a lot of light components which are not parallel to the symmetry axis of the parabolic surface.

The substantially parallel light flux which is emitted from the reflector 2 is incident on the first fly eye lens 3a. The first fly eye lens 3a is configured by a matrix of rectangular lenses with positive refractive power. The light flux incident on the first fly eye lens 3a is divided into a plurality of light fluxes respectively corresponding to the individual lenses. The plurality of light fluxes are condensed and after passing through the second fly eye lens 3b, a matrix of a plurality of source light images is formed near the polarization conversion element 4.

Figure 11:
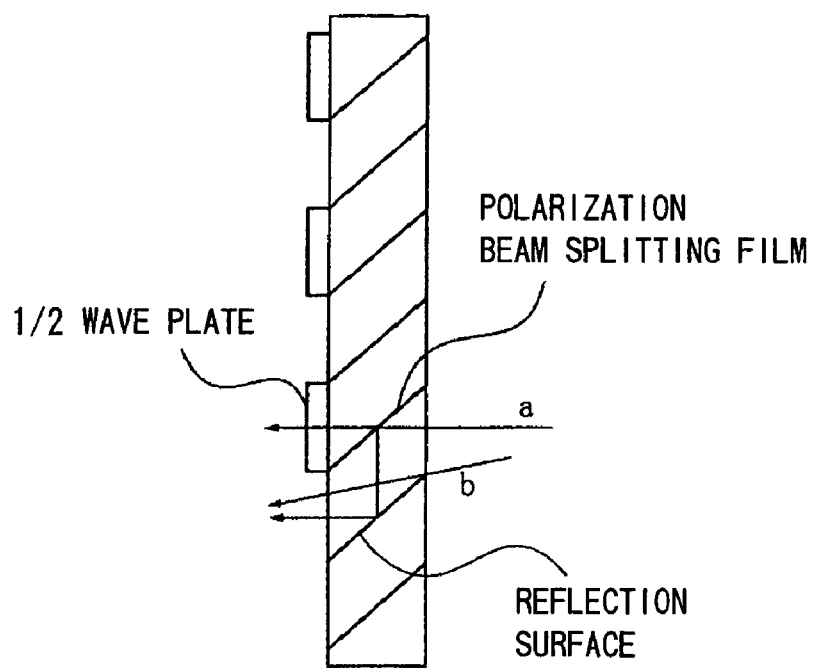
FIG. 11 is a diagram illustrating a polarization conversion element.
Figure 12:
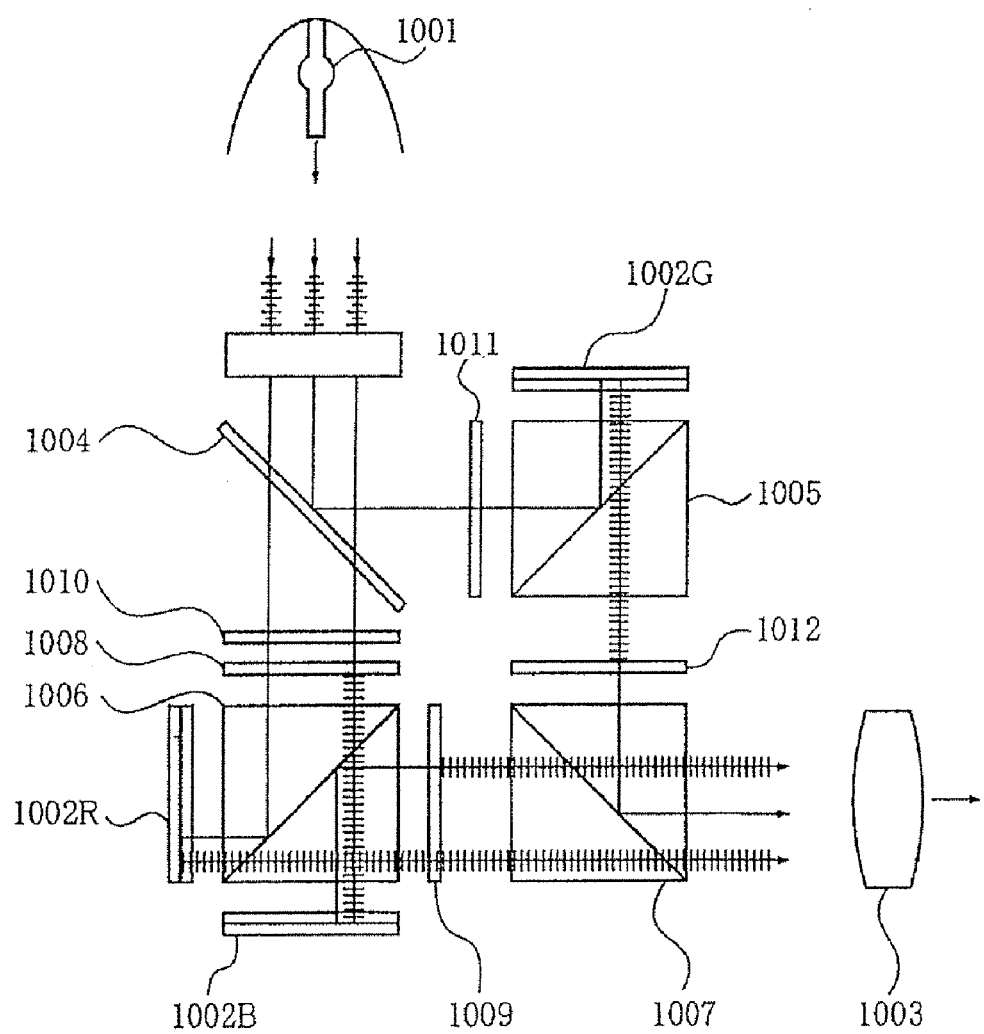
FIG. 12 is a diagram illustrating a conventional example.

As shown in FIG. 11, the polarization conversion element 4 includes polarization separation surfaces, reflection surfaces, and ½ wave plates. The plurality of light fluxes condensed into matrix shape are incident on corresponding polarization separation surfaces, and divided into light of P-polarized components, which are transmitted, and S-polarized components, which are reflected. The light of the reflected S-polarized components is reflected at the reflection surfaces and emitted in the same direction as the P-polarized components, and the P-polarizations component are transmitted by the ½ wavelength plates, thus being converted into polarized components which are the same as the S-polarized components. Consequently, both the S-polarized light reflected at the polarization separation surfaces and the transmitted P-polarized light are both emitted as light (S-polarized light) with aligned polarization direction.

After the plurality of polarization-converted light fluxes have been condensed in the vicinity of the polarization conversion element, they reach a condensing optical system as divergent light fluxes. The condensing optical system includes the condenser lenses 5a and 5b. The plurality of light fluxes overlap with one another at positions where the condensing optical system generates a rectangular image of the first fly-eye lens, forming rectangular uniform illumination areas. The reflective liquid crystal display elements 9r, 9g and 9b are arranged in this illumination area.

Figure 2:
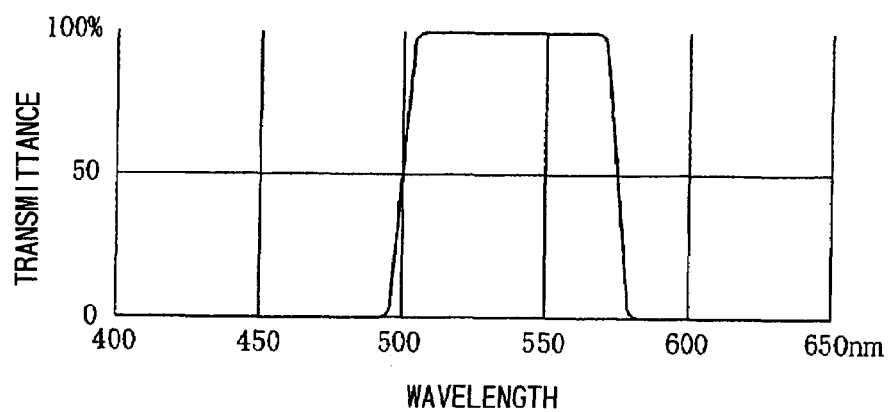
FIG. 2 is a graph showing the characteristics of a dichroic mirror in the first embodiment.

The dichroic mirror 7 arranged within the illumination optical path has the characteristics shown by the solid line in FIG. 2.

The green (G) light component which is color-separated (in this case transmitted) by the dichroic mirror 7 is incident as S-polarized light on the first polarization beam splitter 8a, reflected by its polarization separation surface, and reaches the reflective liquid display element 9g for green. At the reflective liquid display element 9g for green, the green light is image-modulated and reflected. The S-polarized component of the image-modulated green reflection light is again reflected by the polarization separation surface, returns to the light source, and is eliminated from the projection light. The image-modulated P-polarized component of the green reflection light is transmitted by the polarization separation surface.

The light which has been transmitted by this first polarization beam splitter 8a is incident as P-polarized light on the third polarization beam splitter 8c, is transmitted by the polarization separation surface of the third polarization beam splitter 8c, reaches the projection lens 11, and is guided to the projection surface, such as a screen or the like.

Figure 3:
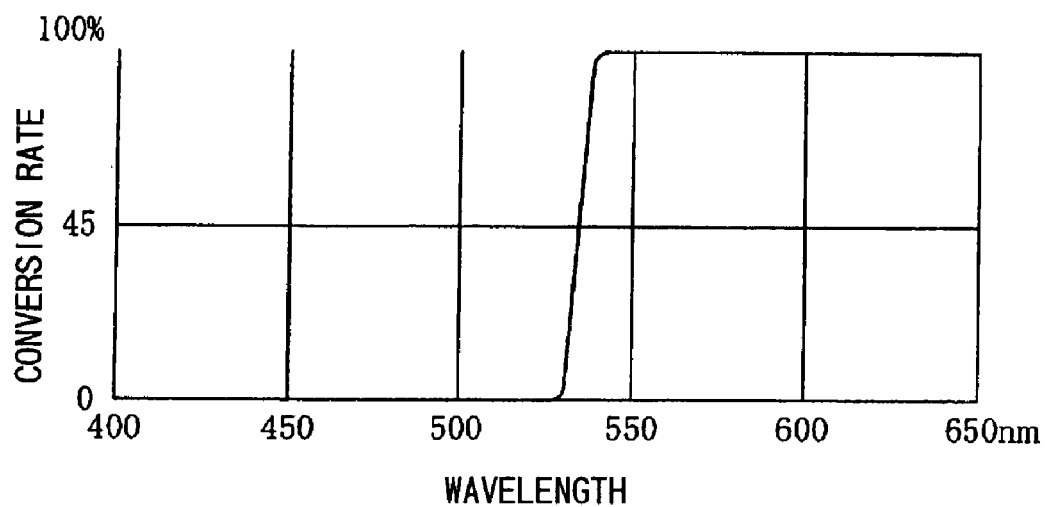
FIG. 3 is a graph showing the characteristics of a first color selective wave plate in the first embodiment.

On the other hand, the red light and blue light reflected by the dichroic mirror 7 are incident on the first color selective wave plate 6a. The characteristics of this first color selective wave plate 6a are shown in FIG. 3. FIG. 3 illustrates the conversion ratio at which the polarization direction is converted to a direction of 90° (perpendicular) to the polarization direction of the incident light. As can be seen in FIG. 3, the polarization direction of light with a wavelength which is longer than about 540 nm is rotated by 90°, whereas light with a wavelength which is shorter than about 530 nm is transmitted by the color selective wave plate without a change in the polarization direction. That is to say, the polarization direction of red light (light in the red wavelength region) is not converted and is transmitted by the color selective wave plate as S-polarized light, whereas the polarization direction of blue light (light in the blue wavelength region) is converted by 90° and is transmitted by the color selective wave plate as P-polarized light.

Accordingly, the blue light is incident on the second polarization beam splitter as P-polarized light and the red light is incident on the second polarization beam splitter 8b as S-polarized light. Thus, the blue light is transmitted by the polarization separation surface of the second polarization beam splitter 8b and reaches the reflective liquid crystal display element 9b for blue, whereas the red light is reflected by the polarization separation surface of the second polarization beam splitter 8b and reaches the reflective liquid crystal display element 9r for red.

The blue light is image-modulated and reflected by the reflective liquid crystal display element 9b for blue. The P-polarized component of the modulated blue reflection light is again transmitted by the polarization separation surface of the second polarization beam splitter 8b, returns to the light source, and is eliminated from the projection light. The S-polarized component of the modulated blue reflection light is reflected by the polarization separation surface, guided to the projection lens 11 arranged at a later stage, and serves as projection light. Similarly, the red light is image-modulated and reflected by the reflective liquid crystal display element 9r for red. The S-polarized component of the modulated red reflection light is again reflected by the polarization separation surface of the second polarization beam splitter 8b, returns to the light source, and is eliminated from the projection light. The P-polarized component of the modulated red reflection light is transmitted by the polarization separation surface, guided to the projection lens 11 arranged at a later stage, and serves as projection light. Thus, the blue and the red projection light are combined to a single light flux.

Figure 4:
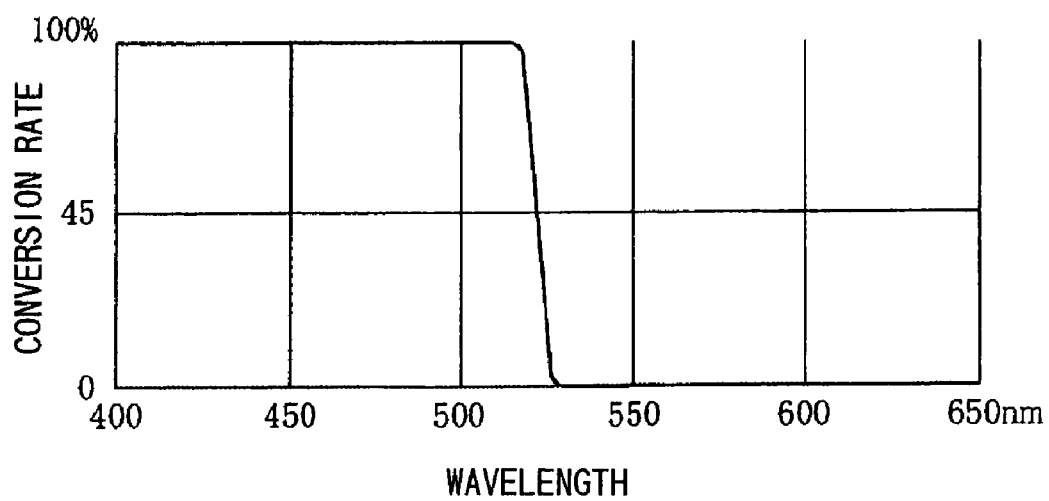
FIG. 4 is a graph showing the characteristics of a first color selective wave plate in the first embodiment.

Before the color-combined blue and red light emerging from the second polarization beam splitter are incident on the third polarization beam splitter, they are incident on the second color selective wave plate 6b. The second color selective wave plate 6b has the characteristics shown in FIG. 4. The blue light is transmitted unchanged as S-polarized light through the second color selective wave plate 6b, whereas the red light is converted from P-polarized light to S-polarized light (i.e. the red light has its polarization direction rotated by 90° and is transmitted by the second color selective wave plate 6b), and is incident on the third polarization beam splitter 8c.

At the third polarization beam splitter, the blue light and the red light are reflected, whereas the green light (light of the green wavelength region) is transmitted, so that the light of the three color red, green and blue (R, G, B) is color combined at the polarization separation surface of this third polarization beam splitter.

This combined RGB projection light is projected by the projection lens 11 onto a screen or the like.

Figure 5A:
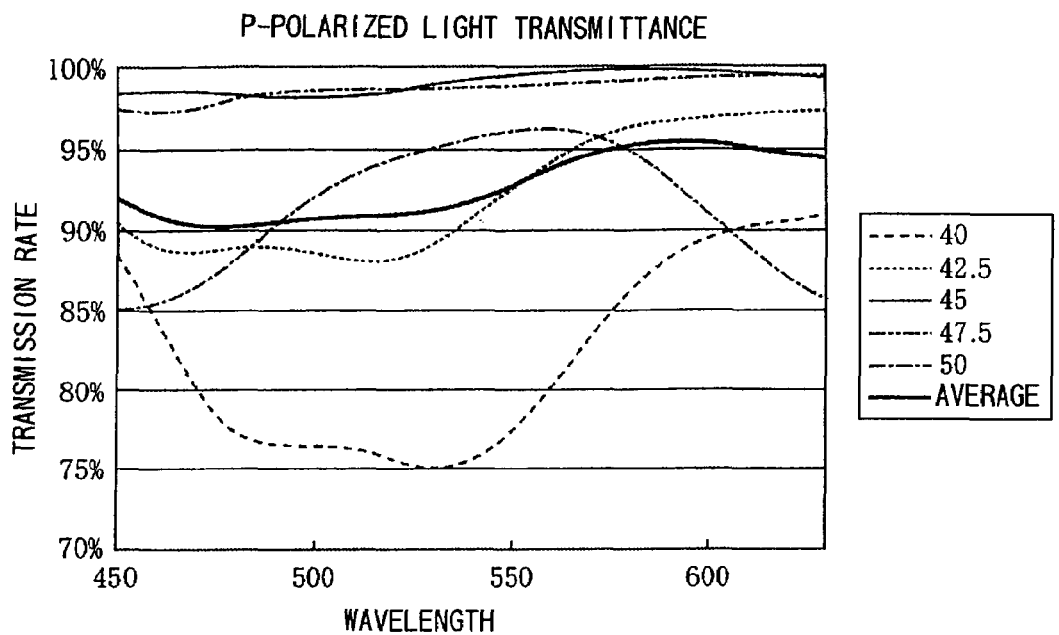
FIGS. 5A and 5B are graphs showing the characteristics of a polarization beam splitter in the first embodiment.
Figure 5B:
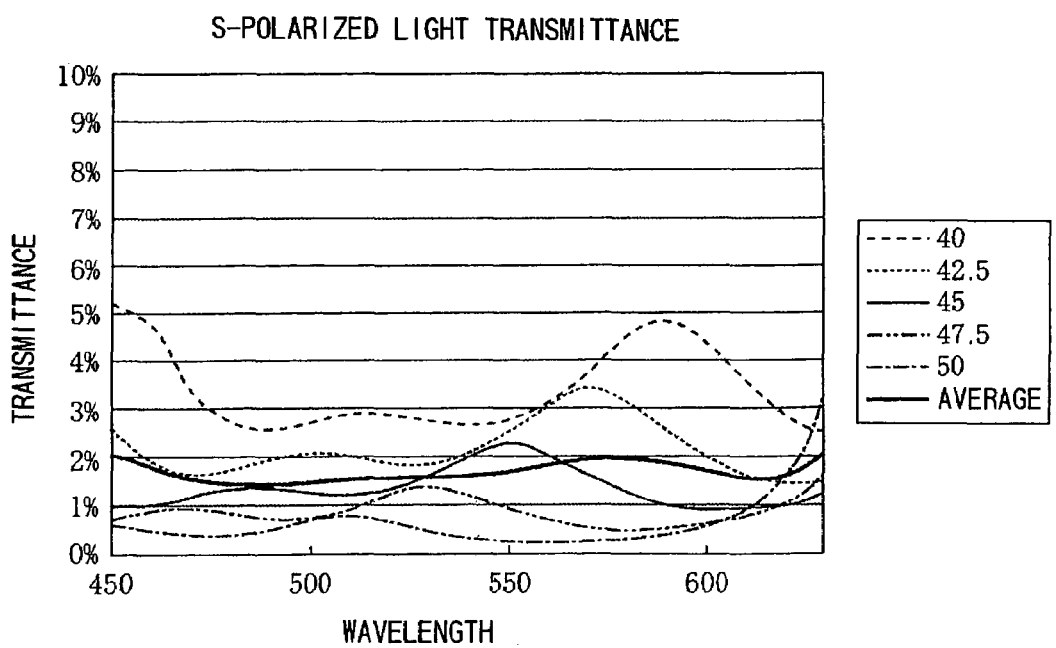

Table 1 shows a design example of the polarization beam splitting film of the polarization beam splitters 8a and 8b used in this embodiment, and FIGS. 5A and 5B are graphs showing the characteristics of this polarization beam splitting film. FIG. 5A shows the transmittance of P-polarized light for incidence angles of 40, 42.5, 45, 47.5 and 50°on the polarization beam splitting film, and FIG. 5B shows the transmittance of S-polarized light for incidence angles of 40, 42.5, 45, 47.5 and 50° on the polarization beam splitting film.

|  | thickness (nm) | refractive index |
|---|---|---|
| substrate |  | 1.61 |
| 1 | 168 | 1.462 |
| 2 | 145 | 2.068 |
| 3 | 101 | 1.382 |
| 4 | 149 | 2.068 |
| 5 | 138 | 1.382 |
| 6 | 141 | 2.068 |
| 7 | 140 | 1.382 |
| 8 | 77 | 2.068 |
| 9 | 125 | 1.462 |
| 10 | 75 | 2.068 |
| 11 | 138 | 1.382 |
| 12 | 71 | 2.068 |
| 13 | 133 | 1.382 |
| 14 | 65 | 2.068 |
| 15 | 92 | 1.462 |
| adhesive |  | 1.51 |

The average transmittances of P-polarized light in the above-noted range of incidence angles are:
in the wavelength range of 450 to 500 nm: Tpb=91%
in the wavelength range of 500 to 580 nm: Tpg=93%
in the wavelength range of 580 to 630 nm: Tpr=95%
In the same wavelength ranges, the average transmittances of S-polarized light are:
Tsb=2%
Tsg=2%
Tsr=2%
When analyzed for P-polarized light, the leakage light Mp is:
Mpb=1−Tpb=9%
Mpg=1−Tpg=7%
Mpr=1−Tpr=5%
When analyzed for S-polarized light, the leakage light Ms is:
Msb=Tsb=2%
Msg=Tsg=2%
Msr=Tsr=2%
Since there is a leakage light of 2% also for the S-polarized light of high light analysis action, there is too much leakage light with only polarization beam splitters, which leads to the problem that a high contrast cannot be attained.

Figure 6A:
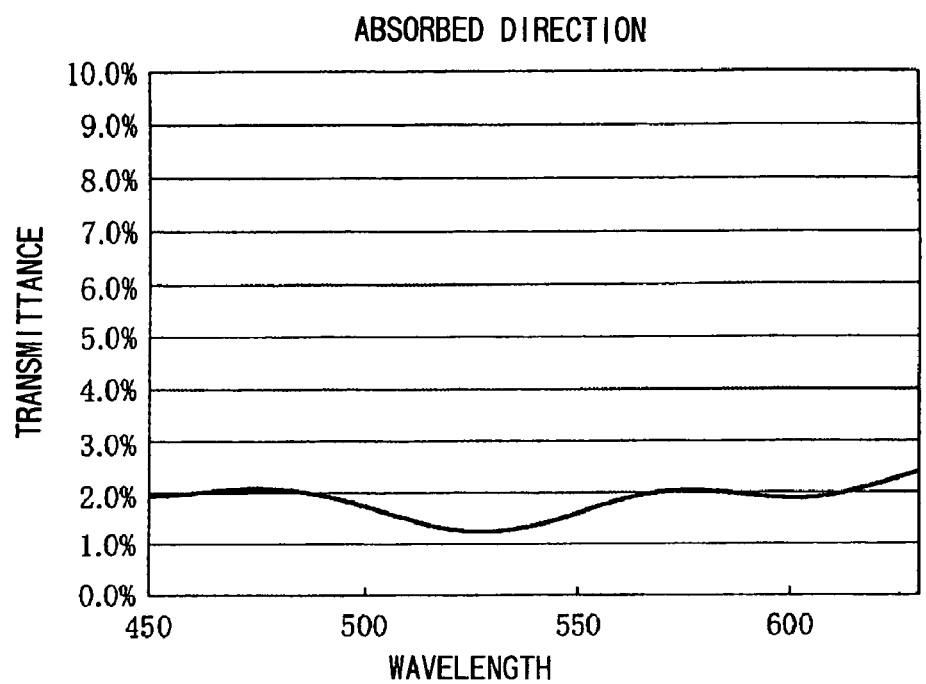
FIGS. 6A and 6B are graphs showing the characteristics of a polarization plate in the first embodiment.
Figure 6B:
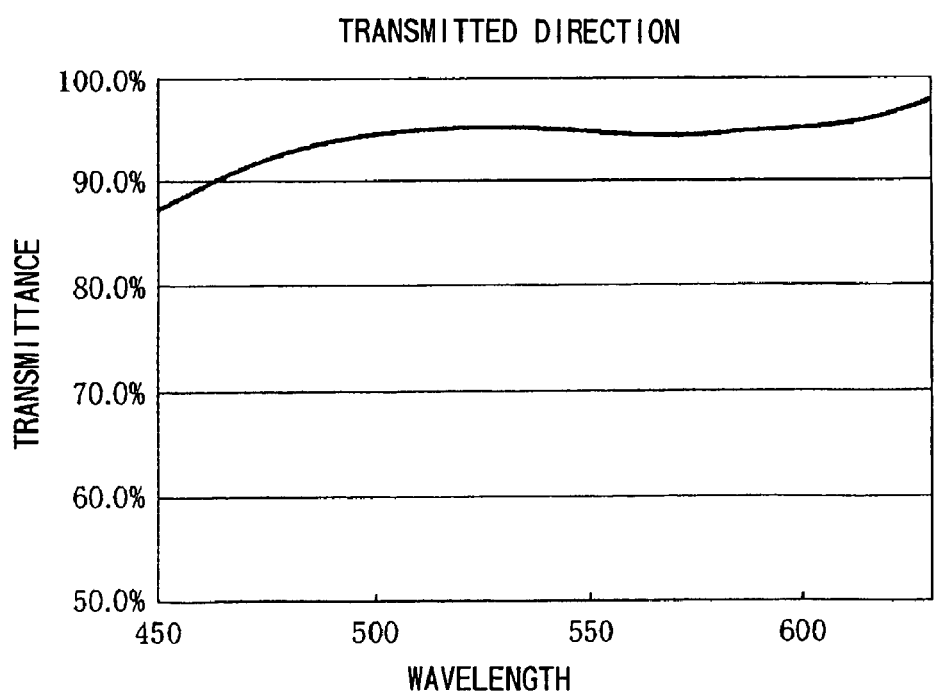

FIGS. 6A and 6B are graphs showing the characteristics of the polarizing plates 12a, 12b, 12c and 12d used in this embodiment.

FIG. 6A shows the transmittance of light with a polarization direction that is to be absorbed. FIG. 6B shows the transmittance of light with a polarization direction to be transmitted.

The average transmittance of the absorbed polarization direction in the wavelength range of 450 to 630 nm is 2%. The average transmittances of the absorbed polarization direction for the above-noted wavelength regions of the color light are:
in the wavelength range of 450 to 500 nm: Kb=2%
in the wavelength range of 500 to 580 nm: Kg=2%
in the wavelength range of 580 to 630 nm: Kr=2%

For the optical path of green light, the light is analyzed by one of the polarizing plates after it has been analyzed as S-polarized light by the polarization beam splitter, so that a light rate (Mg) leaking at the polarizing plate is:

Mg=Msg×Kg=0.04%
Similarly, for the optical path for red light:
Mr=Msr×Kr=0.04%
And for the optical path for blue light:
Mb=Mpb×Kb=0.18%
Thus, by adding the polarizing plates on the emergent side of the polarization beam splitters, the above-noted leakage light of the polarization beam splitters can be cut considerably.

Furthermore, the conversion efficiency of the polarization conversion (aligning the random polarization state of the light source to S-polarized light) with the polarization conversion element 4 used in this embodiment is 95%. The reason why a conversion efficiency of 100% cannot be attained is firstly because the characteristics of the polarization beam splitting film with which the polarization conversion element is provided change with the angle of incidence, and secondly because, as shown in FIG. 11, there is light (light ray b in FIG. 11) which is transmitted by the polarization conversion element without being incident on the polarization beam splitting film. The result of this is that the illumination light which is incident on the polarization beam splitters 8a and 8b includes 5% polarized components which are perpendicular to the original polarization direction, which becomes a cause for a reduction in contrast. When polarizing plates having the characteristics shown in FIG. 6 are provided on the incidence sides of the polarization beam splitters in order to eliminate unnecessary polarized components, then the unnecessary polarized components are reduced to 5%×2%=0.1%, and can be basically ignored.

Moreover, this polarizing plate's average transmittance for the polarization direction which is transmitted in the wavelength range of 450 to 630 nm is 94%, thus allowing a substantial increase in the transmitted light amount compared to the characteristics of an ordinary polarizing plate having high-accuracy polarization characteristics over the entire wavelength range of 450 to 630 nm (about 80%).

Embodiment 2

Figure 7:
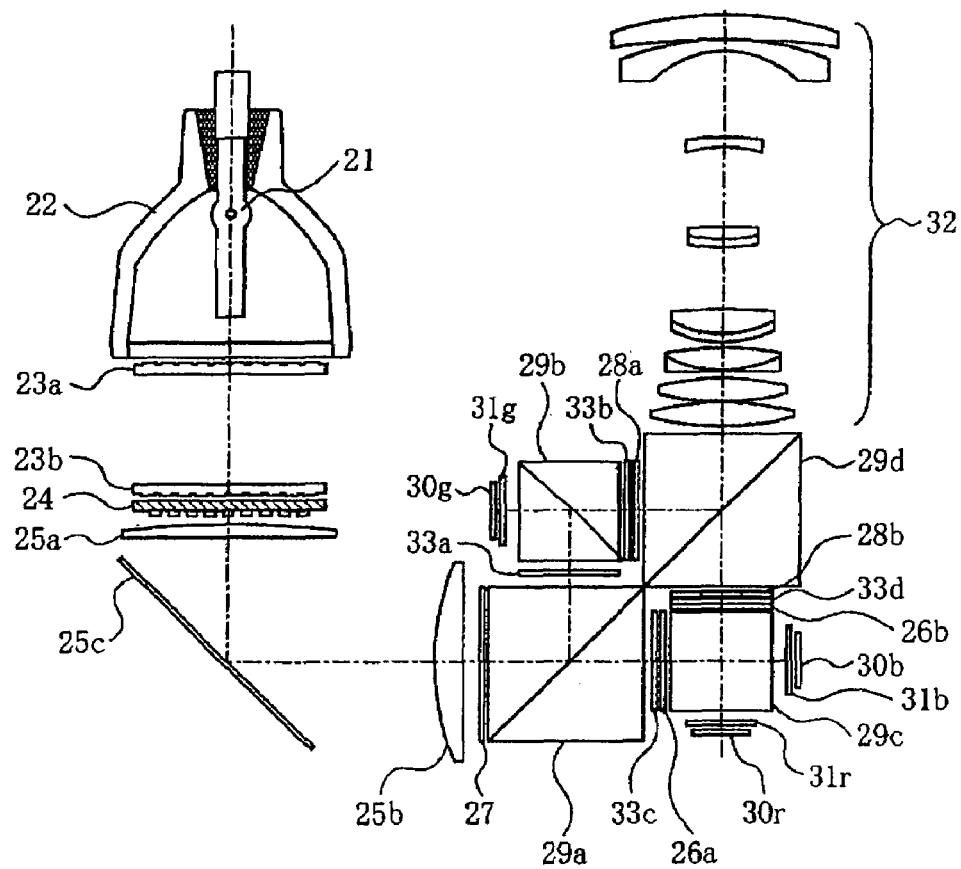
FIG. 7 is a diagram showing a second embodiment of the present invention.

FIG. 7 is a diagram showing a second embodiment of the present invention. In FIG. 7, reference numeral 21 denotes a light source emitting white light with a continuous spectrum. Reference numeral 22 denotes a reflector condensing the light in a predetermined direction. Reference numeral 23a denotes a first fly-eye lens having rectangular lenses in a matrix arrangement. Reference numeral 23b denotes a second fly-eye lens made of a lens array corresponding to the individual lenses in the first fly-eye lens. Reference numeral 24 denotes a polarization conversion element which aligns unpolarized light into polarized light of a predetermined polarization direction (in this Embodiment 2, polarized light which is P-polarized with respect to the polarization beam splitters of the later stages).

Reference numerals 25a and 25b denote condenser lenses, and reference numeral 25c denotes a reflective mirror.

Reference numerals 26a and 26b denote a first color selective wave plate and a second color selective wave plate, which rotate the polarization direction of red light by 90° and do not covert the polarization direction of blue light. Reference numeral 27 denotes a third color selective wave plate, which rotates the polarization direction of green light by 90° and does not covert the polarization direction of blue and red light.

Reference numerals 28a and 28b denote, respectively, a first ½ wave plate and a second ½ wave plate. Reference numerals 29a, 29b, 29c and 29d denote, respectively, a first polarization beam splitter, a second polarization beam splitter, a third polarization beam splitter, and a fourth polarization beam splitter, which transmit P-polarized light and reflect S-polarized light. Numerals 30r, 30g and 30b denote, respectively, a reflective liquid crystal display element for red, a reflective liquid crystal display element for green, and a reflective liquid crystal display element for blue, which reflect light and display an image by image modulation.

Reference numerals 31r, 31g and 31b denote, respectively, a ¼ wave plate for red, a ¼ wave plate for green, and a ¼ wave plate for blue. Reference numeral 32 denotes a projection lens, and reference numerals 33a, 33b, 33c and 33d denote polarizing plates.

Figure 8:
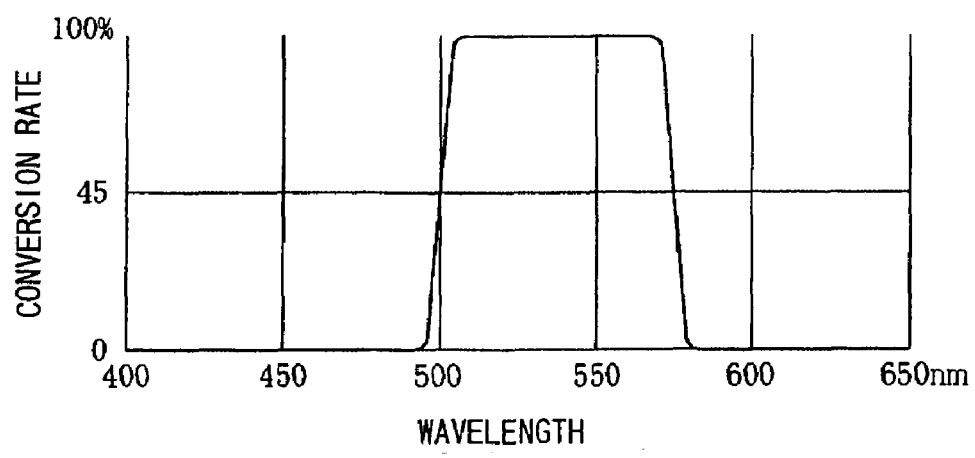
FIG. 8 is a graph showing the characteristics of a first color selective wave plate in the second embodiment.

Here, the polarization conversion element 24 includes polarization separation surfaces, reflection surfaces, and ½ wave plates, and light which is incident on the polarization conversion element 24 emerges as polarized light which is aligned to P-polarized components. The third color selective wave plate 27 which is arranged in the illumination optical path has the characteristics indicated by the solid line in FIG. 8: blue and red light stay P-polarized light, while green light is converted into S-polarized light.

The light whose polarization direction has been adjusted by the third color selective wave plate 27 is incident on the first polarization beam splitter 29a. The green light, which is S-polarized light, is reflected by the polarization separation surface of the first polarization beam splitter 29a, whereas the red and the blue light, which is P-polarized light, is color-separated by being transmitted by the polarization separation surface.

The color-separated green light is incident as S-polarized light on the second polarization beam splitter 29b, is reflected by its polarization separation surface, and reaches the reflective liquid display element 30g for green. At the reflective liquid display element 30g for green, the green light is image-modulated and reflected. The S-polarized component of the image-modulated green reflection light is again reflected by the polarization separation surface of the second polarization beam splitter 29b, returns to the light source, and is eliminated from the projection light. The image-modulated P-polarized component of the green reflection light is transmitted by the polarization separation surface, and serves as projection light.

The light which has been transmitted by the second polarization beam splitter is transmitted by the first ½ wave plate 28a, which is arranged such that a direction forming an angle of 45° with the polarization direction coincides with its slow axis, is incident as S-polarized light on the fourth polarization beam splitter 29d, is reflected by the polarization separation surface of the fourth polarization beam splitter 29d, and is incident on the projection lens 32.

The red light and the blue light which are transmitted by the first polarization beam splitter 28a are incident on the first color selective wave plate 26a. The first color selective wave plate 26a has the characteristics shown in FIG. 4: blue light stay P-polarized light, while red light is converted into S-polarized light.

Accordingly, the blue light is incident on the third polarization beam splitter 29c as P-polarized light and the red light is incident on the third polarization beam splitter 29c as S-polarized light. Thus, the blue light is transmitted by the polarization separation surface of the third polarization beam splitter 29c and reaches the reflective liquid crystal display element 30b for blue, whereas the red light is reflected by the polarization separation surface of the third polarization beam splitter 29c and reaches the reflective liquid crystal display element 30r for red.

The blue light is image-modulated and reflected by the reflective liquid crystal display element 30b for blue. The P-polarized component of the modulated blue reflection light is again transmitted by the polarization separation surface of the third polarization beam splitter 29c, returns to the light source, and is eliminated from the projection light. The S-polarized component of the modulated blue reflection light is reflected by the polarization separation surface of the third polarization beam splitter 29c, and serves as projection light. Similarly, the red light is image-modulated and reflected by the reflective liquid crystal display element 30r for red. The S-polarized component of the modulated red reflection light is again reflected by the polarization separation surface of the third polarization beam splitter 29c, returns to the light source, and is eliminated from the projection light. The P-polarized component of the modulated red reflection light is transmitted by the polarization separation surface, and serves as projection light. Thus, the blue and the red projection light are combined to a single light flux.

The combined red and blue projection light is incident on the second color selective wave plate 26b. The second color selective wave plate 26b is similar to the first color selective wave plate 26a, and rotates only the polarization direction of the red light by 90°, converting both the red and the blue light into S-polarized light. Furthermore, the ½ wave plate 28b whose slow axis is arranged at an angle of 45° to the polarization direction converts the S-polarized light into P-polarized light, which is then incident on the fourth polarization beam splitter 29d, where it is combined with the green projection light by being transmitted by the polarization separation surface of the fourth polarization beam splitter 29d.

Also in this structure, by providing the polarizing plate 33a on the emergent side of the polarization beam splitter 29b, providing the polarizing plate 33d on the emergent side of the polarization beam splitter 29b, providing the polarizing plate 33a on the incident side of the polarization beam splitter 29a, and providing the polarizing plate 33c on the incident side of the polarization beam splitter 29b, the same effect as in Embodiment 1 can be attained by combination of polarization beam splitter characteristics (FIG. 5) and polarizing plate characteristics (FIG. 6) that are the same as in Embodiment 1.

Embodiment 3

Figure 9:
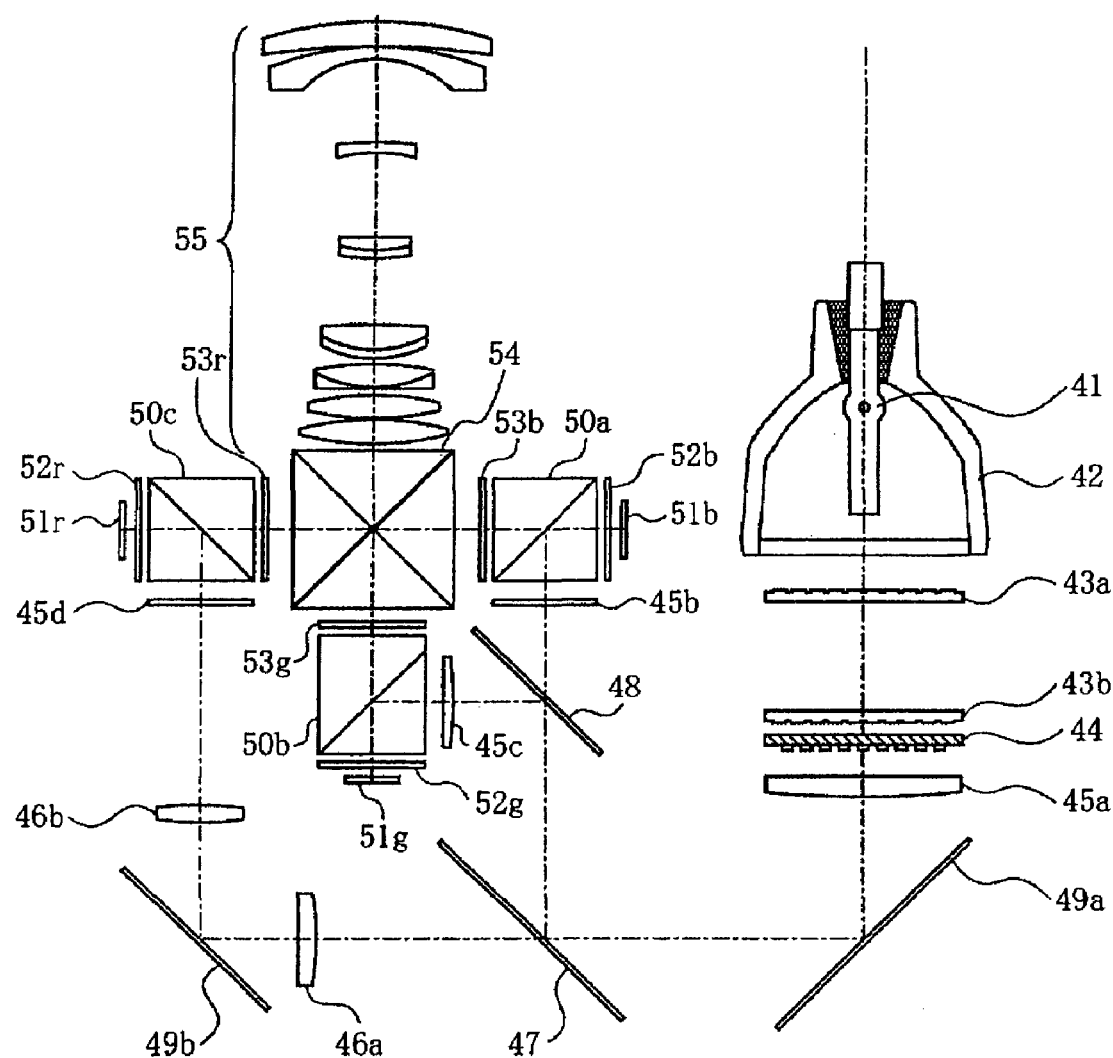
FIG. 9 is a diagram showing a third embodiment of the present invention.

FIG. 9 is a diagram showing a third embodiment of the present invention. In FIG. 9, reference numeral 41 denotes a light source emitting white light with a continuous spectrum. Reference numeral 42 denotes a reflector condensing the light in a predetermined direction. Reference numeral 43a denotes a first fly-eye lens having rectangular lenses in a matrix arrangement. Reference numeral 43b denotes a second fly-eye lens made of a lens array corresponding to the individual lenses in the first fly-eye lens. Reference numeral 44 denotes a polarization conversion element which aligns unpolarized light into polarized light of a predetermined polarization direction. Reference numeral 45a denotes a condenser lens, and reference numerals 45b, 45c and 45d denote field lenses to which a polarizing plate is adhered. Reference numerals 46a and 46b denote relay lenses, which transmit the illumination light of a long optical path without loss.

Reference numeral 47 denotes a dichroic mirror, which transmits light of the wavelength region of red (R), and reflects light of the wavelength region of blue (B) and green (G). Reference numeral 48 denotes a dichroic mirror, which transmits light of the wavelength region of blue (B), and reflects light of the wavelength region of green (G). Reference numerals 49a and 49b denote reflection mirrors. Reference numerals 50a, 50b and 50c denote, respectively, a first polarization beam splitter, a second polarization beam splitter and a third polarization beam splitter, which transmit P-polarized light and reflect S-polarized light. Reference numerals 51r, 51g and 51b denote, respectively, a reflective liquid crystal display element for red, a reflective liquid crystal display element for green, and a reflective liquid crystal display element for blue, which reflect light and display an image by image modulation.

Reference numerals 52r, 52g and 52b denote, respectively, a ¼ wave plate for red, a ¼ wave plate for green, and a ¼ wave plate for blue. Reference numerals 53r, 53g and 53b denote polarizing plates. Reference numeral 54 denotes a dichroic prism having a dichroic surface, and reference numeral 55 denotes a projection lens.

Of the light which is color-separated by the dichroic mirrors 47 and 48, the blue light is incident on the polarization beam splitter 50a, the green light is incident on the polarization beam splitter 50b, and the red light is incident on the polarization beam splitter 50c. In this situation, the illumination light is incident as S-polarized light on the polarization beam splitters 50a, 50b and 50c. Consequently, the illumination light is reflected by the polarization separation surfaces of the respective polarization beam splitters, and reaches the respective reflective liquid crystal display elements 51r, 51g and 51b.

The light is image-modulated and reflected by the respective reflective liquid crystal display elements. The S-polarized components of the modulated reflection light are again reflected by the polarization separation surfaces of the polarization beam splitters 50a, 50b and 50c, return to the light source, and are eliminated from the projection light. The P-polarized components of the modulated reflection light are transmitted by the polarization separation surface and serve as projection light. Thus, the three colors are combined by the dichroic prism 54 and turned into a single light flux.

Figure 10:
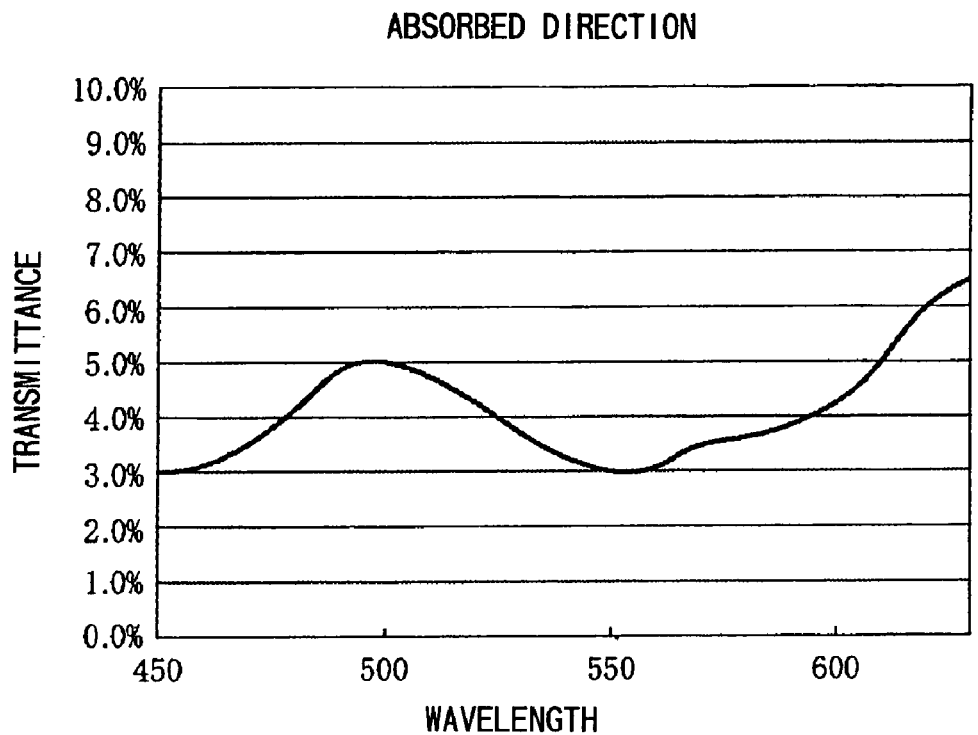
FIG. 10 is a graph showing the characteristics of a polarizing plate in the third embodiment.

Here, in all of the optical paths at the polarization beam splitters 50a, 50b and 50c, analysis is performed with S-polarized light, the polarization beam splitters have the characteristics shown in FIG. 5, and are combined with a polarizing plate as shown in FIG. 10.

In the polarizing plate shown in FIG. 10, the average transmittances of the absorbed polarization direction for the wavelength regions of the color light are:

in the wavelength range of 450 to 500 nm: Kb=4%
in the wavelength range of 500 to 580 nm: Kg=4%
in the wavelength range of 580 to 630 nm: Kr=5%

For the optical path of green light, the light is analyzed by one of the polarizing plates after it has been analyzed as S-polarized light by the polarization beam splitter, so that a light rate (Mg) leaking at the polarizing plate is:

Mg=Msg×Kg=0.08%

Similarly, for the optical path for red light:

Mr=Msr×Kr=0.08%

And for the optical path for blue light:

Mb=Msb×Kb=0.10%

Thus, a high contrast can be realized.

The present invention are not limited to the embodiments described above. For example, instead of the above-described first fly-eye lens and the second fly-eye lens in which rectangular lenses are arranged in a matrix, it is also possible to use a plurality of cylindrical lenses which are lined up in one direction (perpendicular to the optical axis of the illumination optical system).

Moreover, the invention can also be applied to an image projection apparatus having only one liquid crystal panel or an image projection apparatus having four or more liquid crystal panels, instead of an image projection apparatus having three liquid crystal panels.

Also, the optical paths for the colors red, green and blue described in the foregoing embodiments may be interchanged as suitable. Furthermore, in FIG. 1, the optical path for green light is reflected by the polarization beam splitter 8a and incident on the liquid crystal panel, but it may also be transmitted by the polarization beam splitter 8a and incident on the liquid crystal panel 9g, and the image-information-containing light of the light emerging from the liquid crystal panel may be transmitted by the polarization beam splitter 9g and guided to the polarizing plate and the polarization beam splitter of the following stages. The same is true for the optical path of the green light in FIG. 7.

Moreover, in FIG. 1, the color selective wave plates 6a and 6b are arranged in close contact to one of the polarization beam splitters, but they may also be arranged at a distance to that polarization beam splitter. Moreover, they may also be adhered with an adhesion layer arranged between the color selective wave plates and the polarization beam splitter. Conversely, the polarizing plates 12c and 12d in FIG. 1 are arranged at a distance to the color selective wave plates, the dichroic mirror and the polarization beam splitter, but they may also be arranged in close contact with (adhered to) the color selective wave plates, the polarization beam splitter, and the dichroic mirror (a dichroic prism is preferable for adhering the polarizing plates).

Furthermore, in the embodiment of FIG. 1, it is possible to eliminate the polarizing plate 12a from the constitution element of the present invention. In this case, it is advisable to leave the polarizing plate 12b. Conversely, it is possible to eliminate the polarizing plate 12b from the constitution element of the present invention. In this case, it is advisable to leave the polarizing plate 12a.

Furthermore, it is also possible to configure an image projection system using the image projection apparatus of the present embodiment. In this case, an image information supplying apparatus providing image information (such as a personal computer, a TV set, a video recorder, a mobile phone, a memory, or an antenna receiving satellite or terrestrial broadcasts) is linked by a wired or a wireless connection to an image projection apparatus as described above.

While preferred embodiments have been described, it is to be understood that modification and variation of the present invention may be made without departing from the scope of the following claims.

"This application claims priority from Japanese Patent Application No. 2003-331937 filed on Sep. 24, 2003 which is hereby incorporated by reference herein."

What is claimed is:

1. An image projection apparatus, comprising:
a first reflective liquid crystal display element, a second reflective liquid crystal display element, and a third reflective liquid crystal display element;
an illumination optical system comprising a color separation optical system which color-separates light from a light source into a first color light component, a second color light component and a third color light component respectively corresponding to the three reflective liquid crystal display elements, the illumination optical system illuminating the three reflective liquid crystal display elements respectively with the three color light components;

a color combination optical system combining the color light components emerged from the three reflective liquid crystal display elements;

a projection optical system projecting light which has been color-combined by the color combination optical system onto a projection surface; and an incidence side polarizing plate arranged in an optical path from the light source to at least one of the three reflective liquid crystal display elements, wherein an average value of a transmittance, in the entire wavelength region from 450 nm to 630 nm, of the incidence side polarizing plate for light of a polarization direction to be blocked thereby is 5% or less.

2. The image projection apparatus according to claim 1, wherein an average value of a transmittance, in the entire wavelength region from 450 nm to 630 nm, of the incidence side polarizing plate for light of a polarization direction to be transmitted thereby is 90% or more.

3. The image projection apparatus according to claim 1, wherein a first incidence side polarizing plate is arranged in an optical path of the first color light component and a second incidence side polarizing plate is arranged in an optical path which is shared by the second color light component and the third color light component.

4. The image projection apparatus according to claim 3, wherein substantially only the first color light component is incident on the first incidence side polarizing plate, and substantially only the second color light component and the third color light component are incident on the second incidence side polarizing plate.

5. The image projection apparatus according to claim 1, wherein the color separation optical system comprises:
 a first color separation element separating the first color light component from white light emitted by the light source;
 a second color separation element guiding the first color light component emerged from the first color separation element to the first reflective liquid crystal display element; and
 a third color separation element separating the second color light component and the third color light component emerged from the first color separation element and guiding the second color light component and the third color light component respectively to the second reflective liquid crystal display element and the third reflective liquid crystal display element.

6. The image projection apparatus according to claim 5, wherein the first color separation element is a dichroic mirror or a dichroic prism, and
wherein the second color separation element and the third color separation element are polarization beam splitting elements.

7. The image projection apparatus according to claim 5, wherein the first color separation element, the second color separation element and the third color separation element are all polarization beam splitting elements.

8. The image projection apparatus according to claim 5, wherein the first incidence side polarizing plate is arranged between the first color separation element and the second color separation element, and
wherein the second incidence side polarizing plate is arranged between the first color separation element and the third color separation element.

9. The image projection apparatus according to claim 8, wherein a color selective wave plate rotating a polarization direction of one of the second color light component and the third color light component by substantially 90° is arranged between the second incidence side polarizing plate and the third color separation element.

10. The image projection apparatus according to claim 1, wherein an emerging side polarizing plate is arranged in an optical path from at least one of the three reflective liquid crystal display elements to the projection optical system, and
wherein an average value of a transmittance, in the entire wavelength region from 450 nm to 630 nm, of the emerging side polarizing plate for light of a polarization direction to be blocked thereby is 5% or less.

11. The image projection apparatus according to claim 10, wherein an average value of a transmittance, in the entire wavelength region from 450 nm to 630 nm, of the emerging side polarizing plate for light of a polarization direction to be transmitted thereby is 90% or more.

12. An image projection system comprising:
the image projection apparatus according to claim 1; and
an image information supply apparatus supplying image information to the image projection apparatus.

13. An image projection apparatus, comprising:
a first reflective liquid crystal display element, a second reflective liquid crystal display element, and a third reflective liquid crystal display element;
an illumination optical system comprising a color separation optical system which color-separates light from a light source into three color light components corresponding to the three reflective liquid crystal display elements, the illumination optical system illuminating the three reflective liquid crystal display elements respectively with the three color light components;
a projection optical system comprising a color combination optical system which combines the color light components emerged from the three reflective liquid crystal display elements, the projection optical system projecting light which has been color-combined by the color combination optical system onto a projection surface; and
an emerging side polarizing plate arranged in an optical path from the at least one of three reflective liquid crystal display elements to the projection optical system,
wherein an average value of a transmittance, in the entire wavelength region from 450 nm to 630 nm, of the emerging side polarizing plate for light of a polarization direction to be blocked thereby is 5% or less.

14. The image projection apparatus according to claim 13, wherein the emerging side polarizing plate is arranged between the first reflective liquid crystal display element and the projection optical system, and
another emerging side polarizing plate is arranged between the second and third reflective liquid crystal display elements and the projection optical system,
wherein an average value of a transmittance, in the entire wavelength region from 450 nm to 630 nm, of the other emerging side polarizing plate for light of a polarization direction to be blocked thereby is 5% or less.

15. The image projection apparatus according to claim 14, further comprising:
an incidence side polarizing plate which is arranged between the light source, and the second and third reflective liquid crystal display elements, wherein an average value of a transmittance, in the entire wavelength region from 450 nm to 630 nm, of the incidence side polarizing plate for light of a polarization direction to be blocked thereby is 5% or less.

16. The image projection apparatus according to claim 15, further comprising:
a first color separation optical element separating a first color light which reaches the first reflective liquid crystal display element from a second color light and a third color light which reach the second and third reflective liquid crystal display elements, respectively,
wherein the incidence side polarizing plate is arranged between the first color separating optical element, and the second and third reflective liquid crystal display elements.

17. An image projection system comprising:
the image projection apparatus according to claim 13; and
an image information supply apparatus supplying image information to the image projection apparatus.

18. An image projection apparatus, comprising:
a first reflective liquid crystal display element, a second reflective liquid crystal display element, and a third reflective liquid crystal display element;
a color separation optical system color-separating light from a light source into a first color light component, a second color light component and a third color light component respectively corresponding to the three reflective liquid crystal display elements; and
a projection optical system comprising a color combination optical system which combines color light components emerged from the three reflective liquid crystal display elements, the projection optical system projecting light which has been color-combined by the color combination optical system onto a projection surface,
wherein the color separation optical system comprises:
a first color separation element separating light from the light source into the first color light component and the second and third color light components;
a second color separation element guiding the first color light component to the first reflective liquid crystal display element;
a third color separation element separating the second color light component and the third color light component and guiding the second color light component and the third color light component respectively to the second reflective liquid crystal display element and the third reflective liquid crystal display element;
a first incidence side polarizing plate arranged between the first color separation element and the second color separation element;
a second incidence side polarizing plate arranged between the first color separation element and the third color separation element; and
a first color selective wave plate arranged between the second incidence side polarizing plate and the third color separation element and rotating a polarization direction of the second color light component by substantially 90°,
wherein the color combination optical system comprises:
a first color combination element, a second color combination element, and a third color combination element; the first color combination element guiding the first color light component emerged from the first reflective liquid crystal display element to the third color combination element, the second color combination element color-combining the second color light component emerged from the second reflective liquid crystal display element and the third color light component emerged from the third reflective liquid crystal display element and guiding the second color light component and the third color light component to the third color combination element; and the third color combination element color-combining the first, second and third color light components, and guiding the color-combined three color light components to the projection optical system;
a first emerging side polarizing plate arranged between the first color combination element and the second color combination element;
a second emerging side polarizing plate arranged between the second color combination element and the third color combination element; and
a second color selective wave plate arranged between the second emerging side polarizing plate and the third color combination element, the second color selective wave plate rotating a polarization direction of the third color light component by substantially 90°,
wherein an average value of a transmittance, in the entire wavelength region from 450 nm to 630 nm, of each of the first and second incidence side polarizing plates for light of a polarization direction to be blocked thereby is 5% or less,
an average value of a transmittance, in the entire wavelength region from 450 nm to 630 nm, of each of the first and second incidence side polarizing plate for light of a polarization direction to be transmitted thereby is 90% or more,
an average value of a transmittance, in the entire wavelength region from 450 nm to 630 nm, of each of the first and second emerging side polarizing plates for light of a polarization direction to be blocked thereby is 5% or less, and
an average value of a transmittance, in the entire wavelength region from 450 nm to 630 nm, of each of the first and second emerging side polarizing plate for light of a polarization direction to be transmitted thereby is 90% or more.

19. An image projection system comprising:
the image projection apparatus according to claim 18; and
an image information supply apparatus supplying image information to the image projection apparatus.

20. An image projection apparatus in which light from a light source is color-separated into a first color light component, a second color light component and a third color light component and illuminates a first reflective liquid crystal display element, a second reflective liquid crystal display element and a third reflective liquid crystal display element, and wherein the color light components emerged from the three reflective liquid crystal display elements are combined and projected onto a projection surface, the image projection apparatus comprising:
a color separation element color-separating light from the light source into the first color light component, and the second and third color light components;
a first incidence side polarizing plate analyzing the first color light component emerged from the first color separation element;
a first polarization beam splitting element reflecting or transmitting light emerged from the first incidence side polarizing plate and guiding that light to the first reflective liquid crystal display element, and transmitting or reflecting a first image light component emerged from the first reflective liquid crystal display element and emitting the first image light component;

a first emerging side polarizing plate analyzing the first image light component emerged from the first polarization beam splitting element;

a second incidence side polarizing plate analyzing the second and third color light components emerged from the color separation element;

a first color selective wave plate rotating a polarization direction of the second color light component among the light emerged from the second incidence side polarizing plate by substantially 90°;

a second polarization beam splitting element color-separating light emerged from the first color selective wave plate into the second color light component and the third color light component, guiding the second color light component and the third color light component respectively to the second reflective liquid crystal display element and the third reflective liquid crystal display element, and color-combining a second image light component emerged from the second reflective liquid crystal display element and a third image light component emerged from the third reflective liquid crystal display element;

a second color selective wave plate rotating a polarization direction of the third color light component among the light emerged from the second color selective wave plate polarization beam splitting element by substantially 90°;

a second emerging side polarizing plate analyzing light emerged from the second polarization beam splitting element;

a third polarization beam splitting element color-combining the first image light component emerged from the first emerging side polarizing plate and the second and third image light components emerged from the second emerging side polarizing plate, wherein an average value of a transmittance, in the entire wavelength region from 450 nm to 630 nm, of each of the first and second incidence side polarizing plates for light of a polarization direction to be blocked thereby is 5% or less, an average value of a transmittance, in the entire wavelength region from 450 nm to 630 nm, of each of the first and second incidence side polarizing plate for light of a polarization direction to be transmitted thereby is 90% or more, an average value of a transmittance, in the entire wavelength region from 450 nm to 630 nm, of each of the first and second emerging side polarizing plates for light of a polarization direction to be blocked thereby is 5% or less, and an average value of a transmittance, in the entire wavelength region from 450 nm to 630 nm, of each of the first and second emerging side polarizing plate for light of a polarization direction to be transmitted thereby is 90% or more.

21. An image projection system comprising:

the image projection apparatus according to claim 20; and an image information supply apparatus supplying image information to the image projection apparatus.

* * * * *